United States Patent [19]
Yeo

[11] Patent Number: 5,503,076
[45] Date of Patent: Apr. 2, 1996

[54] MULTI-COLOR PRINTED NONWOVEN LAMINATES

[75] Inventor: Richard S. Yeo, Dunwoody, Ga.

[73] Assignee: Kimberly-Clark Corporation, Neenah, Wis.

[21] Appl. No.: 161,101

[22] Filed: Dec. 1, 1993

[51] Int. Cl.$^6$ .................................................. D06P 3/00
[52] U.S. Cl. .................................... 101/483; 156/384
[58] Field of Search ............................ 101/211, 417, 101/470, 483; 156/384, 385, 386, 387

[56] References Cited

U.S. PATENT DOCUMENTS

| | | | |
|---|---|---|---|
| 3,117,905 | 1/1964 | Smith, II | 161/64 |
| 3,666,594 | 5/1972 | Condon et al. | 156/291 |
| 4,340,563 | 7/1982 | Appel et al. | 264/518 |

FOREIGN PATENT DOCUMENTS 1174426  12/1969  United Kingdom.

OTHER PUBLICATIONS

Database WPI. Section Ch, Week 8731, Derwent Publications, Ltd., London, GB; Class A93, AN 87–219088 & JP,A,62 146 621 (Dainippon Printing KK), 30 Jun. 1987.

Abstract.

Primary Examiner—David A. Wiecking
Attorney, Agent, or Firm—Patrick C. Wilson

[57] ABSTRACT

Disclosed herein is a multi-color printed nonwoven laminate and a process for producing the laminate. The laminate includes a fibrous nonwoven web facing layer and a substrate layer bonded to the facing layer by a plurality of colored adhesive inks applied in a discrete bond pattern between the facing and substrate layers. The inks must provide a cohesion strength between the layers of at least about 38,000 N/m$^2$ and the inks must be visible through the surface or the facing layer. The laminate so produced has good delamination characteristics, is aesthetically pleasing and the printed patterns are resistant to abrasion due to the position and nature of the inks. Suitable uses include an outercover for personal care absorbent articles such as diapers, training pants, incontinence garments, sanitary napkins, bandages and the like as well as a material for use as all or a portion of an article of clothing or a surgical drape.

2 Claims, 1 Drawing Sheet

MULTI-COLOR PRINTED NONWOVEN LAMINATES

FIELD OF THE INVENTION

The present invention is directed to multi-color printed nonwoven laminates. More specifically, the present invention is directed to multi-color printed nonwoven laminates wherein the printing takes places between the laminated layers thereby making the overall laminate suitable for a wide variety of uses where abrasion has been a problem such as, for example, the outercovers of personal care products including diapers, training pants, incontinence garments, sanitary napkins, bandages and the like.

BACKGROUND OF THE INVENTION

Many products today employ multi-layered nonwoven laminates as sub-components of their overall designs. Personal care products made from laminates such as diapers and training pants employ outercovers made from plastic films which are laminated or bonded to a fibrous nonwoven layer. The plastic film layer tends to restrict outward migration of fluids such as urine and feces while the nonwoven layer provides an exterior layer of comfort which is pleasing to the touch of the user and anyone associated with the user. One example of such a product is the Kimberly-Clark HUGGIES®PULLUPS® training pants which include a polyethylene plastic film adhesively laminated to a polypropylene spunbond nonwoven web. To make such products more attractive, the exterior nonwoven surface is often printed with a series of patterned or designs using various colored inks. Typically such inks are applied using flexographic printing processes to adhere the ink to the nonwoven layer. The fibrous polypropylene spunbond nonwoven web is in turn bonded to the plastic layer by a spray adhesive to bond the two layers together. One problem that has arisen in the past is that the printing on the exterior surface of the nonwoven is subject to sufficient amounts of abrasion to cause the ink to wear off thereby detracting from the aesthetic properties of the product.

To improve the appearance of the exterior of the diaper, at least one other diaper manufacturer, Weyerhauser Company, has produced a diaper with a two layer outercover including a nonwoven outer layer and a film inner layer. In between the two layers there is a single color design. It is believed that a single color adhesive design is applied to the interior surface of the nonwoven layer using a rotogravure single-roll printer with the nonwoven layer and the film layer subsequently being brought into contact with one another thereby forming the laminate.

Another method of printing nonwovens has included extrusion coating a layer of film onto a fibrous nonwoven layer and then printing reverse images on the film layer which are subsequently visible through both the film and nonwoven layers. Still another method of printing has been to print multiple-colored inks onto a surface of a film, coat the printed film with a spray adhesive and then laminate the printed film to a layer of nonwoven such that the inks reside between the film and nonwoven layers and are visible through the nonwoven layer.

A particular disadvantage of the foregoing processes is the number of steps and the stiff nature of the resultant product. First, one of the interior surfaces of the film/nonwoven laminate must be printed with ink and the ink must be allowed sufficient time to dry. Next, adhesive is applied across the surface (generally the entire surface) of one of the two layers and the two layers are then attached to one another. Due to the broad application of adhesive, the laminate is often stiffer than it should be. As a result, there is a need for n improved process for printing and laminating films and nonwovens.

In more simplified diaper designs, the outercover is devoid of a nonwoven layer and consists of a single layer of plastic film. Many diapers having such outercover constructions employ multi-color printing processes to impart multi-color patterns to the exterior surface of the plastic film to improve the aesthetic properties of the diaper. Such colors have been printed on the plastic film layer using either flexographic or rotogravure printing processes. In order to improve the colorfastness of the printing, the films are generally pre-treated using a corona discharge treatment. The problem with these designs is that they lack the cloth-like feel which has been found to be aesthetically pleasing.

Despite the foregoing attempts to provide films, nonwovens and laminates with multi-color printing with good abrasion resistance, there is still a need for a nonwoven laminate with improved colored adhesion utilizing a multi-color printing pattern. It is therefore an object of the present invention to provide a nonwoven laminate with a multi-colored printing pattern.

It is another object of the present invention to provide a process for making a multi-color nonwoven laminate which provides good resistance to abrasion. These and other objects of the present invention will become more apparent upon a further review of the following specification, claims and drawings.

SUMMARY OF THE INVENTION

It is an object of the present invention to provide a nonwoven laminate with a multi-colored printing pattern. It is another object of the present invention to provide a process for making a multi-colored nonwoven laminate which provides resistance to abrasion. It is still a further object of the present invention to provide a multi-color nonwoven laminate with good adhesion between the layers of the laminate.

The foregoing objects of the present invention are accomplished by way of the present multi-color printed nonwoven laminate and its method of production. The multi-color printed nonwoven laminate is made from a fibrous nonwoven web facing layer and a substrate layer which is bonded to the fibrous nonwoven web facing layer by a plurality of colored adhesive inks which are positioned between the facing layer and the substrate layer in a discrete bond pattern. The plurality of colored adhesive inks provide a cohesion strength between the facing and substrate layers of at least about 38,000 Newtons per square meter with the plurality of colored adhesive inks being visible through the fibrous nonwoven web facing layer. The colored adhesive inks used to bond the two layers together comprise, on a dry weight basis, from about 50 to about 99.5 percent of a polymer which is soluble or dispersible in water or an organic solvent and from about 0.5 to about 50 percent of a pigment. Examples of polymers suitable for use with the colored adhesive ink include polyvinyl alcohol, ethylene vinyl acetate and latex. To achieve appropriate cohesive strengths between the layers, the combined add-on of the colored adhesive inks should range from between about 1.3 and about 5 grams per square meter.

The fibrous nonwoven web facing layer provides a soft, comfortable surface which is particularly well suited for use as an outercover on personal care products. The substrate layer in such applications is removed from actual contact with the user and, as a result, can be made from any material which will readily bond with the plurality of colored adhesive inks. Suitable substrate layers include films, fibrous nonwoven webs, film/fibrous nonwoven web laminates and multi-layered fibrous nonwoven webs.

The process for forming a multi-color printed nonwoven laminate requires printing a first colored adhesive ink onto a surface of the substrate layer and sequentially printing a second adhesive ink and, if desired, additional colored adhesive inks onto the surface of the substrate layer in a generally non-overlapping pattern with respect to each applied ink. Next, the fibrous nonwoven web facing layer is positioned on top of and in face-to-face relationship with the surface of the substrate layer to bond the facing layer and substrate layer together. Typically this is facilitated by placing the facing layer and substrate layer under compression and then drying the laminate.

The selection of the color adhesive inks will depend upon the printing equipment being used and the actual time between the application of the colored adhesive ink to a surface of the substrate and the actual bonding of the two layers together. Adhesives can be designed with various open assembly times and, therefore, it may be advantageous to formulate the initially-applied colored adhesive inks with longer open assembly times than the subsequently-applied colored adhesive inks so that the initially-applied colored adhesive inks do not prematurely dry out and lose their adhesive tack forces prior to the bonding of the two layers together.

It is also possible to vary the process as, for example, by applying the colored adhesive inks to the interior surface of the facing layer as opposed to the interior surface of the substrate layer or by applying select colored adhesive inks to both the interior surface of the facing layer and the interior surface of the substrate layer. To create a laminate with a more bulky appearance, it is also possible to place at least one of the substrate and facing layers under tension while bonding the two layers together to form a laminate and then relaxing the laminate after the bonding step, thereby causing the laminate to retract and create a bulkier appearance.

The material of the present invention, once formed, has a wide variety of uses, not the least of which is as an outer cover for a personal care absorbent article such as an incontinence device, diaper, training pant, or sanitary napkin. Such personal care absorbent articles typically include a body-side liner and an outercover with an absorbent core disposed therebetween. The multi-color printed nonwoven laminate of the present invention can be employed as the outer cover for such articles, typically with the fibrous nonwoven facing layer facing towards the exterior of the article. Other uses for the material of the present invention include a material for forming all or a portion of an article of clothing or for use in the construction of all or a portion of a surgical drape or gown. Such uses and other advantages of the present invention will become more apparent upon a further review of the following specification, drawings and claims.

DETAILED DESCRIPTION OF THE INVENTION

Figure 1:
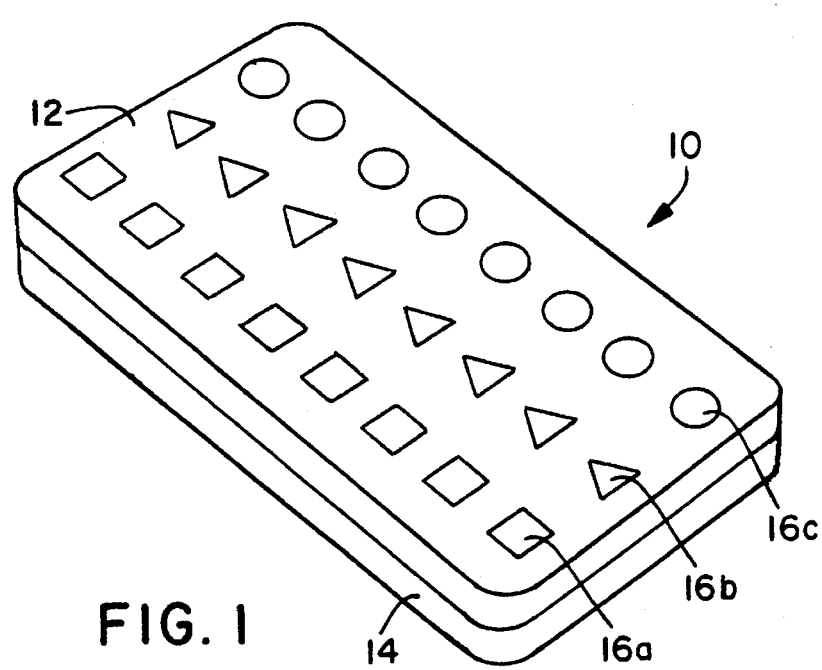
FIG. 1 is a top plan view of a print pattern which can be used with a multi-color printed nonwoven laminate according to the present invention.
Figure 2:
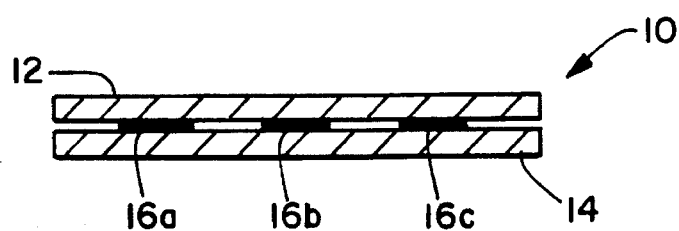
FIG. 2 is a cross-sectional side view of a multi-color nonwoven laminate.

The present invention is directed to multi-color printed nonwoven laminates. Referring to FIG. 1 of the drawings, there is shown a multi-color printed nonwoven web laminate 10 according to the present invention including a fibrous nonwoven facing layer 12, a substrate layer 14 and a plurality of adhesive-inks 16. The adhesive inks 16 include at least two and, in this particular embodiment, three separate colors such as, for example, red, blue and green as denoted by reference numeral 16a, 16b and 16c respectively. Each of the colored or pigmented inks 16, serve two functions. First, they adhesively bond the facing layer 12 to the substrate layer 14. Second, due to the translucent nature of the nonwoven facing layer 12, the ink patterns 16a, 16b and 16c impart a multi-color pattern which is visible through the nonwoven facing layer 12. By "visible" it is meant that the colors and/or images can be identified at a distance of one meter from the surface of the facing layer by a person having 20/20 vision either actual or corrected. As a result, it is possible to provide colorful and visually appealing patterns to the laminate which are in turn protected from abrasion due to their being located between the facing layer 12 and the substrate layer 14. In addition, the visible patterns serve to adhesively bond the two layers together.

The nonwoven facing layer 12 is fibrous in nature so as to provide the aesthetic feel and properties of a textile-like material. Typical fibrous nonwovens include nonwoven materials made from spunbond, meltblown, carding, air-laid and wet laid processes. In addition, woven materials and knitted materials may also be used and thus are contemplated to be within the scope of the term "fibrous nonwoven web facing layer".

Two particularly useful materials for the facing layer are spunbond nonwoven webs and bonded carded webs. Fibrous spunbond webs are well known and can be made in accordance with the teachings of U.S. Pat. No. 4,340,563 to Appel et al which is commonly assigned to the assignee of record and incorporated herein by reference in its entirety. The formation of bonded carded webs is also well known to those skilled in the art of nonwovens. The fibers of the carded webs may be bonded using several techniques including thermal bonding, ultrasonic bonding, powder bonding and adhesive bonding. The nonwoven webs can be made from a wide variety of polymers including but not limited to polyolefins, polyesters, etc.

Basis weight ranges for facing layer 12 will vary depending upon the particular end use. For personal care absorbent articles, basis weights will typically range between about 10 and about 35 grams per square meter (gsm) and more likely between about 14 and about 20 gsm. Fiber sizes will also depend on the particular end use. Again for outercovers for personal care absorbent articles fiber sizes will usually be less than about 30 microns and more likely in the range of about 10 to 22 microns. For basis weights less than 17 gsm a fiber size of less than 22 microns and more desirably less than 18 microns is useful from the standpoint of better aesthetic appearance.

One of the factors in selecting the fiber type and basis weight for the facing layer 12 is the opacity of the facing layer. As shown by the data in the examples below, opacity values should range between about 15 and about 40 percent. For webs having opacity values much greater than 40 percent the visibility of the printed color patterns will be substantially reduced by the facing layer 12. For webs having opacity values much less than 15 percent the visibility of the facing layer itself will be poor resulting in a less cloth-like appearance for the overall composite. The opacity of the facing layer can be adjusted by both basis weight and pigment loading levels for the individual fibers and webs. Higher basis weights will give greater opacity as will higher pigment loadings in the fibers themselves.

The loading of fibers with pigment is well known. Titanium dioxide ($TiO_2$) is one commonly known and widely used material. A $TiO_2$ level of about 0.5 to about 4.0 percent, based upon the total weight of the web, is generally suitable for facing layers according to the present invention when used as outercovers for personal care absorbent articles.

For many applications it is often desirable to keep the facing layer liquid repellent. As a result the fibers used to make the facing layer can be chosen to be hydrophobic or they can be treated to be hydrophobic. In other applications it may be more desirable to have a facing layer with more hydrophilic properties. As a result, in such situations the fibers selected can be inherently hydrophilic or treated to be such.

The substrate layer 14 does not necessarily have to have a cloth-like appearance since in such applications as outercovers for personal care absorbent articles the substrate layer is an interior layer of the overall product. Consequently, the substrate layer can be made from any material which will suitably accept printing by the adhesive ink and inks in general. Suitable materials therefore include, for example, nonwovens, wovens and knits of the same type as discussed above with respect to the facing layer as well as films.

Depending upon the particular application, the substrate layer can be designed to possess certain degrees of properties such as water vapor permeability, liquid repellency, stretchability, biodegradability and dispersibility/flushability within a toilet/waste sewage system. The requirement for a liquid barrier is important in diaper and training pant applications when the material of the present invention is to be used as an outercover. This requirement is usually greater than with personal care absorbent articles such as sanitary napkins due to the nature and viscosity of the particular body fluids involved. Film substrates are desirable when high liquid barrier properties are needed whereas hydrophobic fibrous materials can be employed if liquid barrier performance is not critical.

If cost is not critical, it may be desirable to use a breathable or microporous film as the substrate layer 14. Such breathable films are well known and may be made breathable due to, for example, the type of polymer chosen to form the film or the addition of fillers.

In order to increase the cloth-like appearance and feel of the overall composite 10, the substrate layer 14 may be placed under tension prior to its being bonded to the facing layer 12. Once the two layers have been bonded, the tension can be removed and the composite laminate will tend to pucker thereby increasing the basis weight and feel of the material.

For film-based substrate layers the thickness of the film will range from about 8 to about 25 microns though the actual film thickness will depend upon the particular end-use. The film can contain pigments such as titanium dioxide to increase the opacity of the substrate layer and thereby hinder the visibility of any underlying body waste fluids. In addition, pigmented and thus more opaque materials provide a better printing background for the inks and better visibility of the printed pattern. Typical pigment levels will range from about 3 to about 10 percent on a dry weight basis based upon the total weight of the film.

For fibrous-based materials and especially nonwovens, the fiber size used to make the substrate layer will range from about 1 to about 20 microns and more desirably from about 1 to about 5 microns. Basis weights for the fibrous-based materials should be at least about 17 gsm and more desirably at least about 24 gsm.

The substrate layer 14 as described thus far has been a single layer of material. It is also possible, however to make the substrate layer 14 from multi-layer constructions such as a film/nonwoven composite or a multi-layer nonwoven such as a spunbond/meltblown or a spunbond/meltblown/spunbond laminate.

Printing inks are the third component of the present invention. The printing inks are adhesive-based. The adhesive-based inks can be water-based, solvent-based or hot melt adhesives with water-based adhesives working the best from the combined standpoint of applicability to the substrate layer and environmental friendliness. They will typically include a pigment or other coloring agent in an amount of from about 0.5 to about 50 percent on a dry weight basis, based upon the total dry weight of the adhesive ink. In addition, the adhesive inks once used to bond the facing and substrate layers together should provide a bond or cohesion strength as outlined below of at least 38,000 Newtons per square meter. This will typically happen when the total add-on level for the adhesive inks is between about 1.3 and about 5 grams per square meter (gsm). Typical bond area will be between about 10 and 20 percent of the surface area being printed. In addition, the printing pattern will be discrete due to the limited bond area and the different colored adhesive inks will be applied in a generally non-overlapping pattern. Once the layers have been laminated together, it will take at least 2.5 kilogram per square inch of force or 38,000 Newtons per square meter ($N/M^2$) to separate the two layers. The strength of the lamination was measured by measuring the adhesion force between the two layers of the composite material as described with respect to the examples below.

Generally the adhesive inks will contain on a dry weight basis from about 50% to about 99.5% adhesive and from about 0.5% to about 50% pigment. In addition, up to 10% thickening agent can be added to the formulation. Coloration can be imparted to the adhesive by the use of inert pigments and dyes which are collectively referred to as "pigments" for purposes of the claims. The viscosity of the adhesive ink will range from about 100 to about 12,600 centipoise with higher viscosity inks working better.

Suitable water-based adhesives include polyvinyl alcohol, ethylene vinyl acetate, polyvinyl acetate, ethylene acrylic acid, vinyl acetate acrylic acid, styrene acrylic acid, polyurethane, polyvinylindine chloride, starch, chemically-modified starch, dextrin and water soluble polymers as well as water-dispersible polymers such as latexes provided the specific material or materials have film forming and bonding properties. Latexes are milky colloids in which natural or synthetic rubber or plastic is suspended in water. The glass transition temperature, Tg, of these water-based adhesives range from approximately −50° to 80° C. with a more desirable range being between about −7° and 27° C. Such adhesives are film-forming and produce flexible printed areas when dried or cured at relatively low drying temperatures which typically range between about 65° and 150° C.

Suitable solvent-based adhesives include natural rubber, and other elastomers, acrylics, polyurethanes, polyamides, phenolic resins, and poly(vinyl acetal)s. A related composition is vinyl resin dispersed in a plasticizer to form a plastisol. Before heating, the physical form of the plastisol actually resembles a dispersion. Upon heating the plastisol forms a solution of sufficiently high viscosity at room temperature such that cured adhesive has excellent shear resistance. Several of these solvent-based adhesives are commercially available. National Starch and Chemical Company of Bridgewater, N.J. sells a neoprene rubber-based adhesive using toluene, hexane, acetone and isopropanol as solvents under the trademark SPRAYMASTER® 388.

Suitable hot-melt adhesives for use in conjunction with the adhesive ink include polyethylene and other polyolefins or mixtures of the same, ethylene-vinyl acetate copolymers, polyamides, polyesters and block copolymer rubbers. Typical additives used to modify the flow characteristics and other properties of these hot-melt adhesives include waxes, oils, terpene resins, rosin derivatives, phenolic resins and coumarone invene resin.

Dyes and inorganic and organic pigments, collectively "pigments" are the common colorants used in conjunction with the adhesive inks of the present invention. The most common dyes include Azo dyes, (e.g, Solvent Yellow 14, Disperse Yellow 23, Metanil Yellow), anthraquinone dyes, (Solvent Red 111, Disperse Violet 1, Solvent Blue 56 and Solvent Green 3), Xanthene dyes (Solvent Green 4, Acid Red 52, Basic Red 1, and Solvent Orange 63), azine dyes (Jet black) and the like.

Inorganic pigments include titanium dioxide (white), carbon black (black), iron oxides (red, yellow, and brown), chromium oxide (green), ferric ammonium ferrocyanide (blue) and the like. Major organic pigments include diarylide yellow AAOA (Pigment Yellow 12), diarylide yellow AAOT (Pigment Yellow 14), phthalocyanine blue (Pigment Blue 15), lithol red (Pigment Red 49:1), and (Red Lake C Pigment Red With the water-based, solvent-based and hot-melt based adhesive inks, there is also the ability to incorporate other additives. For examples, plasticizers, extenders, thickening agents, defoaming agents, wetting agents or surfactant, waxes and antioxidants may be utilized in conjunction with the adhesive inks of the present invention.

Whatever type of substrate layer is chosen, the surface of the layer should be uniform so that it can readily accept the printing of the adhesive-based inks and inks in general. As with the fibrous-based materials used for the facing layer, the substrate layer can be treated with materials such as fluorocarbons to make the layer more hydrophobic.

Figure 3:
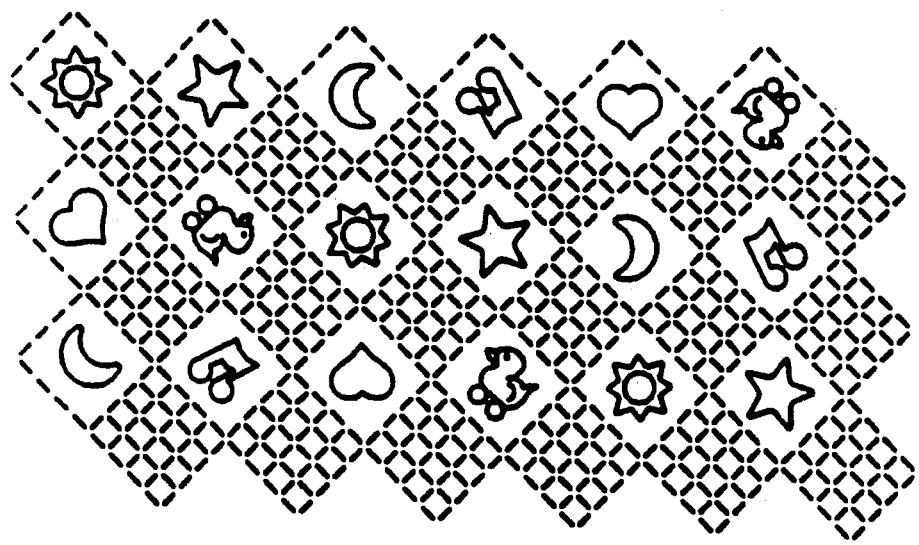
FIG. 3 is a perspective view of a bond pattern suitable for use with a diaper having an outercover made from a multi-color printed nonwoven laminate according to the present invention.

The multi-color printed nonwoven laminate of the present invention can be used for a variety of applications, not the least of which is all or a part of an outercover for a personal care absorbent article including diapers, training pants, incontinence devices, sanitary napkins, bandages and the like. Typically such articles include a bodyside liner and an outercover with an absorbent core disposed therebetween. The material of the present invention can be used, with the nonwoven side out, as the outercover material. In such situations, the printing design can be, for example, a pattern such as is shown in FIG. 3 of the drawings.

Other applications of the material of the present invention would include, but are not limited to, a material for constructing all or a portion of an article of clothing, especially for disposable and limited use articles such as workwear for cleanroom and hospital applications. In both situations a low lint material must be used to prevent contamination. In such applications it is also common that the material provide some type of barrier property. The material of the present invention can satisfy both these needs. Nonwovens can be designed to be low linting. The film layer can act as a barrier to liquids. By printing and laminating at the same time with a multi-colored adhesive print pattern, a material is generated which is aesthetically pleasing and functional. As a result, the material of the present invention can be used to fashion such hospital-related items as gowns, masks, headwear, footwear, pants and shirts as well as surgical drapes and other items. When so doing, a colored adhesive ink should be selected which is compatible with sterilization techniques.

The process for forming the multi-color printed nonwoven laminates of the present invention involves sequentially applying the inks onto a surface of the substrate layer that will be brought into contact with the facing layer. It is desirable that the inks be applied in a non-overlapping pattern so that clearer definition of the printed patterns can be obtained. Furthermore, it is desirable that the colored adhesive inks be applied in a discrete bond pattern which means that the pattern covers less than 50% of the surface area of the substrate layer. Once the inks have been applied, the facing layer is brought into contact with the substrate layer in a face-to-face relationship. To bring about better bonding between the two layers it is advisable to place the layers under pressure as by running the formed laminate through one or more pairs of nip rollers to compress the laminate. At the same time or sequentially thereafter the laminate may be heated to facilitate drying of the laminate. This may be accomplished by, for example, heating the nip rolls or by using separate heaters to dry the laminate. For hot-melt adhesives, heating is not necessary, but forced air can be used to speed drying.

As mentioned earlier, the process may be further modified by placing one of the layers and preferably the substrate layer under tension by, for example, braking or increasing the line speed of the substrate layer as the laminate is fed into the nip. Once the laminate has bonded sufficiently, the tensional forces can be relieved thereby causing the laminate to relax and pucker which causes the laminate to feel bulkier.

Another process variable is to apply one or more of the inks to the facing layer in addition to or in lieu of the substrate layer. When using a film as the substrate layer, however, it is generally more desirable to print the inks on the film layer as it is smoother than the fibrous-based facing layer and therefore will permit greater print pattern definition.

Testing has indicated that certain printing processes and equipment work better than others for providing good print pattern definition. For example, flexographic and ink-jet printing equipment work better than rotogravure equipment. In the rotogravure process, the non-printed areas of the printing roll are all at the same level as the areas that receive the ink to form the printed character. The means on the printing roll for printing the ink are actually wells or depression which are engraved into the rolls usually at different depths. Only one color can be fed to a single printing roll in order to prevent intermixing of colors/inks. To achieve multiple colors, multiple rolls must be used but this will cause problems since the inks printed on the printing surface will transfer to the subsequent printing rolls resulting in intermixing of all the colors and causing the printing substrate to stick to the printing rolls thereby causing processing problems.

In contrast, flexographic and ink jet printing processes and equipment can handle multi-color printing. With flexographic equipment the transfer rolls transfer ink to the printing substrate via raised areas on the roll. The non-raised areas do not contact the printing substrate and therefore, if the subsequent printing patterns on downstream printing rolls are not overlapping, the printing pattern will be clean and the equipment will not become fouled.

With ink jet printing, the individual inks or colors are sprayed from different nozzles directly onto the substrate without the use of an intermediate transfer surface. Consequently, there can be no fouling of the equipment.

When using particular types of adhesive inks, certain printing processes and equipment work better than others. For example, hot-melt adhesives are only sufficiently viscous when heated and therefore work better with ink jet printing equipment. Water-based and solvent-based adhesive inks on the other hand can be used with both flexographic and ink jet printing equipment. Care should be taken when using solvent-based adhesives with flexographic equipment as certain solvents may interfere with the rubber on the printing rolls thereby compromising the quality of the printing process and possibly damaging the equipment.

Ink jet printing equipment generally requires inks that have a very low viscosity, often in the range of 1 to 10 centipoise, in order to achieve appropriate and application processing. Water-based and solvent-based adhesives can be brought into this range by increasing their liquid content while hot-melt adhesives can be brought into this range through sufficient heating.

When selecting the particular type of adhesive ink to use, attention should also be paid to the printing process and equipment used as well as the number of inks being used and the interval between application of the ink and actual bonding of the two layers together. Inks have an open assembly time which is related to the amount of time the adhesive remains tacky and bondable once it has been applied to a substrate. If the open assembly time of an ink is too short, the ink will lose its bonding ability before it is brought in contact with the other layer of material and, as a result, will not provide an effective bond between the two layers. Consequently, depending upon the speed of the process, it may be desirable to vary or adjust the open assembly times of the colored adhesive inks being used. Generally, the ink that is applied at the furthest distance from the actual bonding point in the process should have a longer open assembly time than an ink that is applied just prior to the bonding process. By providing longer open assembly times for the first applied inks, there will be a higher probability that these inks will still be bondable once the facing and substrate layers are brought together. Conversely, the inks that are applied last or closest to the bonding step should have relatively short open assembly times so that once the two layers have been pressed together, the inks will not take an inordinate amount of time to cure or set. Thus, it is generally more desirable to have the first applied ink have a longer open assembly time than the second or subsequently applied inks.

EXAMPLES

A series of samples of materials according to the present invention were formed and tested as indicated by the following examples. It should be understood that the following examples are illustrative only and should not be construed as a limitation as to the scope of the present invention.

Opacity Measurement

The opacity of the fabric is measured by a "contrast-ratio" method based on the fact that the reflectance of a fabric, when combined with a white backing, is higher than when it is combined with a black backing. The method used was ASTM-D589-90 and the opacity was measured with a 89% reflectance backing.

Cohesion strength

The strength of the laminate was measured by measuring the cohesion force between the two layers of the composite material. The minimum force required to separate the two layers was given in kilograms of force per square inch and was converted to Newtons per square meter.

For each sample, the cohesion force of a 1 inch square sample was measured using a Chatillon Digital Force Gauge Model DFI 50 from John Chatillon and Sons, Inc., of Greensboro, N.C. The device has a pneumatically operated base plate measuring 2 inches by 4 inches and a one inch square top plate which was connected to a digital force gauge. Double-faced adhesive tape was applied to both the base plate and the top plate and a 2 inch by 4 inch sample of material was positioned on top of the 2 inch by 4 inch base plate. The tape used to cover the surfaces of both the base plate and top plate was Scotch® Brand double-coated pressure-sensitive tape number 406, which is available in 1-inch and 2-inch widths. The 2-inch width tape was used for the base plate and the 1-inch wide strip tape was used for the top plate. Once the sample had been placed on top of the base plate, the base plate and sample were compressed for a period of 3 seconds under a pressure of 60 pounds per square inch. After 3 seconds, the pressure was released. The digital force gauge was then activated and the sample was compressed between the base plate and top plate at 60 psi for a period of 10 seconds. Next, the base plate was drawn away from the top plate and the separation force was measured in kilograms per square inch and then converted to Newtons per square meter. The amount of force required to separate the laminate was then recorded.

EXAMPLE 1

In example 1 a 25 micron (1 mil) thick polyethylene film was printed and bonded to a 15 gsm polypropylene spunbonded web at a line speed of approximately 100 feet per minute (30 m/min). The film was a standard polyethylene film produced by the Edison Plastics Company of South Plainfield, N.J. This type of film is routinely used as an outercover material for personal care absorbent articles such as diapers. The film was printed with four colored adhesive inks using a six inch wide, four color flexographic printing press model 650 manufactured by Webtron Company of Glenview, Ill.

The inks were printed onto the film which had an opacity of about 50% in the sequence yellow, green, red and blue using the bond pattern shown in FIG. 3. Total add-on for the adhesive inks was 2.96 grams per square meter with the blue ink occupying the diamond grid pattern in the overall pattern depicted in FIG. 3 and the yellow, green and red inks occupying the figure patterns. Total bond area was approximately 13 percent. To facilitate bonding, the laminate was dried with heated air. The cohesion strength was measured and found to be 6.31 kilograms per square inch or 95,850 Newtons per square meter. The opacity of the spunbond facing layer was 24.12%.

The yellow, green and red adhesive inks were water-based polyvinyl alcohol inks which, on a weight percent basis, based upon the total weight of the inks contained 83% polyvinyl alcohol and 17% conventional pigment. The yellow L6007Y, green L6007G and red L6007R adhesive inks were produced by Findley Adhesives, Inc. of Wauwatosa, Wis. The blue adhesive ink was a water-based ink from B&B Ink and Lacquer Inc. of Atlanta, Ga. containing a modified ethylene vinyl acetate copolymer manufactured by Adhesion Systems, Inc. of Paterson, N.J., and sold as AS 375 4A. The adhesive ink on a dry weight basis was 99.5% ethylene vinyl acetate and 0.5% blue pigment. The yellow, green and red adhesive inks had a relatively longer open assembly time than did the blue adhesive ink. The printing pattern sequence was yellow, green, red and then blue. Because of the longer open assembly times, the yellow, green and red adhesive inks remained open longer and thus maintained their tackiness until after the spunbond nonwoven facing layer was brought into contact with and bonded to the film substrate layer.

EXAMPLE 2

In example 2 the same facing and substrate layers were used as in example 1 using the same equipment and process. The yellow, green and red adhesive inks were also the same as in example 1. The blue adhesive ink used in example 2 was designated L8057E and was produced by Findley Adhesives, Inc. The adhesive ink contained on a weight percent basis, 80% ethylene vinyl acetate, 12% dipropylene glycol and 8% conventional pigment. The blue adhesive ink had a relatively shorter open assembly time in comparison the other three inks. The inks were printed on the film layer in the same sequence as in example 1 with a total add-on of 2.34 gsm using the bond pattern shown in FIG. 3. The cohesion strength was measured to be 5.05 kg/in$^2$ (76,710 N/m$^2$).

From the examples it can be seen that a wide variety of combinations can be made in the constructions of the material of the present invention. The cohesion strength generated between the facing and substrate layers should be at least 38,000 N/m$^2$ and the inks/images should be visible through the facing layer at a distance of one meter.

Having thus described the invention in detail, it should be appreciated that various modifications and changes can be made in the present invention without departing from the spirit and scope of the following claims.

I claim:

1. A process for forming a multi-color printed nonwoven laminate comprising:

printing a first colored adhesive ink onto a surface of a substrate layer, sequentially printing a second colored adhesive ink onto a surface of a fibrous nonwoven web facing layer, positioning said surface of said fibrous nonwoven web facing layer on top of and in face-to-face relationship with said surface of said substrate layer to bond said facing layer and said substrate layer together while said facing layer and said substrate layer are under compression to form a laminate, and drying said laminate.

2. A process for forming a multi-color printed nonwoven laminate comprising:

printing a first colored adhesive ink having a first open assembly time onto a surface of a substrate layer, sequentially printing a second colored adhesive ink having a second open assembly time onto said surface of said substrate layer, said second open assembly time being less than said first open assembly time, positioning a fibrous nonwoven web facing layer on top of and in face-to-face relationship with said surface of said substrate layer to bond said facing layer and said substrate layer together while said facing layer and said substrate layer are under compression to form said laminate, and drying said laminate.

\* \* \* \* \*